(12) United States Patent
Smith et al.

(10) Patent No.: US 9,528,656 B1
(45) Date of Patent: Dec. 27, 2016

(54) ELASTOMERIC, HYDROGEN-RESISTANT BIOPOLYMER AND ITS USE IN OIL AND GAS REFINING, AND IN THE STORAGE AND TRANSPORT OF HYDROGEN GAS

(71) Applicant: Arrowhead Center, Inc., Las Cruces, NM (US)

(72) Inventors: Geoffrey Battle Smith, Las Cruces, NM (US); David C. Johnson, Las Cruces, NM (US); Shuguang Deng, Las Cruces, NM (US); Nagamany Nirmalakhandan, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 0 days.

(21) Appl. No.: 14/514,177

(22) Filed: Oct. 14, 2014

Related U.S. Application Data

(60) Provisional application No. 61/890,661, filed on Oct. 14, 2013.

(51) Int. Cl.
  *C08B 16/00* (2006.01)
  *F17C 1/16* (2006.01)
(52) U.S. Cl.
  CPC ........ *F17C 1/16* (2013.01); *C08B 16/00* (2013.01)
(58) Field of Classification Search
  CPC ..................................................... C08B 16/00
  See application file for complete search history.

(56) References Cited

U.S. PATENT DOCUMENTS

| | | | |
|---|---|---|---|
| 7,759,287 B2 | 7/2010 | Salyer |
| 8,093,041 B1 | 1/2012 | Nirmalakhandan et al. |
| 8,211,681 B2 | 7/2012 | Zhang et al. |
| 8,227,222 B2 | 7/2012 | Sumino et al. |
| 8,318,453 B2 | 11/2012 | Medoff |
| 8,343,749 B2 | 1/2013 | Nirmalakhandan et al. |
| 8,372,947 B2 | 2/2013 | Fedorov |
| 2008/0081900 A1 | 4/2008 | Fedorov |
| 2009/0282839 A1 | 11/2009 | Sigal |
| 2010/0181212 A1 | 7/2010 | Koch et al. |

FOREIGN PATENT DOCUMENTS

| | | |
|---|---|---|
| CN | 1528905 | 9/2004 |
| TW | 290172 | 11/2007 |
| WO | WO 2009/067771 A1 * | 6/2009 |

OTHER PUBLICATIONS

"Appendix C—Gasious Hydrogen Piping Specification", http://avt.inl.goy/pdf/hydrogen/h2station_appendixc.pdf, Feb. 19, 2001.
"Gas Pipes-Approved Materials", http://www.engineeringtoolbox.com/approved-gas-pipes-d_1112.html, 2013.
Crabtree, et al., "The Hydrogen Economy", Physics Today, Dec. 2004, 39-45.

(Continued)

*Primary Examiner* — Robert Harlan
(74) *Attorney, Agent, or Firm* — Isaac Estrada; Deborah A. Peacock; Peacock Myers, P.C.

(57) ABSTRACT

A new generation elastomeric biopolymer produced by yeast belonging to the family Saccharomycetaceae, and an isolated yeast belonging to the genus *Williopsis* that produces and secretes the biopolymer.

6 Claims, 6 Drawing Sheets

(56) References Cited

OTHER PUBLICATIONS

Johnson, "Physiological Characteristics, Hydrogen Partial Pressure Traits and Microbial Community Analysis of a Novel Low-ph Hydrogen Producing Microbiome", May 2011.
Perera, et al., "Evaluation of dairy cattle manure as a supplement to improve net energy gain in fermentative hydrogen production from sucrose", Bioresource Technology, Feb. 12, 2011, 8688-8695.

* cited by examiner

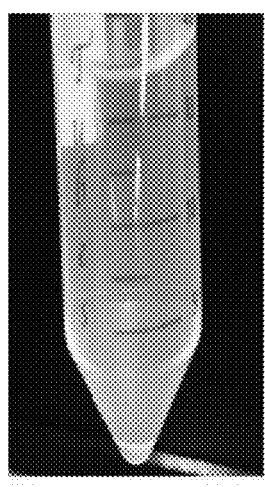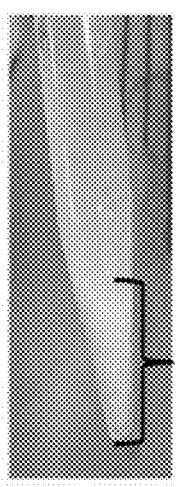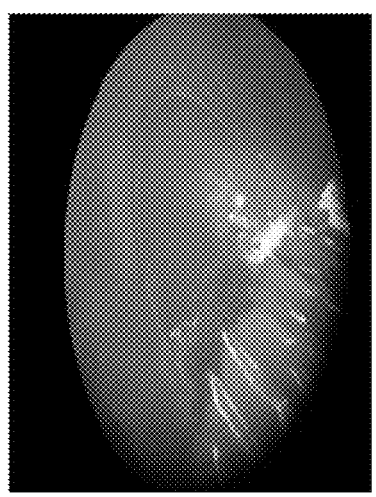
FIG. 4A                    FIG. 4B

ELASTOMERIC, HYDROGEN-RESISTANT BIOPOLYMER AND ITS USE IN OIL AND GAS REFINING, AND IN THE STORAGE AND TRANSPORT OF HYDROGEN GAS

CROSS-REFERENCE TO RELATED APPLICATIONS

This application claims priority to and the benefit of the filing of U.S. Provisional Patent Application Ser. No. 61/890,661, entitled "ELASTOMERIC HYDROGEN-CAPTURING BIOPOLYMER AND ITS USE IN STORAGE AND TRANSPORT OF HYDROGEN GAS AND ITS APPLICATION IN GAS SEPARATION TECHNOLOGIES", filed on Oct. 14, 2013, and the specification and claims thereof are incorporated herein by reference.

STATEMENT REGARDING FEDERALLY SPONSORED RESEARCH OR DEVELOPMENT

This invention was made with government support under Contract No. BES-0607175 awarded by the National Science Foundation. The government has certain rights in the invention.

BACKGROUND OF THE INVENTION

1. Field of the Invention (Technical Field)

The present invention relates to the production of polymers, and more specifically to a cellular-produced biopolymer capable of trapping and resisting hydrogen gas, and to the use of the cellular-produced polymer to protect surfaces prone to hydrogen corrosion during petroleum refining, during hydrogen biofuel production, and use of the polymer as a hydrogen storage medium.

2. Description of Related Art

Hydrogen gas is a fuel source that can transform the energy system in the United States. Hydrogen gas can be produced from coal or natural gas, but this method is energetically inefficient. A different area involves the use of hydrogen-producing bacteria in organic matter to obtain hydrogen gas. Some such processes use food resources including corn as a feedstock for ethanol production, but a more useful approach employs organic waste including cow manure, which is readily available and not already used for another purpose.

One of the main obstacles to the widespread use of hydrogen as a fuel source is that hydrogen gas is very difficult to store for transportation and distribution. The technical issues for the storage of hydrogen gas include the need for protection against both hydrogen leakage and corrosion, as well as applications in preventing moisture- and oxygen-driven contamination of gas storage materials. In order for hydrogen gas to be used as a significant energy source, a low cost and efficient method of storing and transporting hydrogen gas is needed. Similarly, current steps in oil and gas refining involve removing hydrogen gas from the product stream, and there is need to protect production surfaces from hydrogen's corrosive effects.

Embodiments of the present invention comprise the isolation of a yeast belonging to the family Saccharomycetaceae and its stimulation to produce and export from the cell a novel elastomeric biopolymer herein referred to as Hydromer™. This biopolymer is capable of capturing and storing hydrogen gas as it is produced. The biopolymer's elastomeric properties allow it to expand as hydrogen is added.

Most research into hydrogen storage is focused on sorbing hydrogen gas at ultra-low temperatures but then are limited by the rate at which the hydrogen can be released during fuel consumption demand. The Hydromer™ polymer provides an alternate approach to hydrogen storage by providing a material that does not sorb hydrogen gas, but rather repels hydrogen. The ability of Hydromer™ to non-interactively retain hydrogen gas is supported by its measured surface area, hydrogen adsorption capacity and pore volume (data is outlined below). Analogous to a material being water-proof, this material is hydrogen-proof and thus provides a new-generation means to store hydrogen gas in an expansive and contractive bladder which retains and supplies on demand hydrogen gas at ambient temperatures. The physicochemical characteristics of Hydromer™ also support its use in the oil and gas industry protecting surfaces from the corrosive effects of hydrogen gas.

BRIEF SUMMARY OF THE INVENTION

Embodiments of the present invention comprise yeast belonging to the family Saccharomycetaceae, which produce and secrete, when cultured in the presence of nutrients, a new generation elastomeric biopolymer with a pore small enough to capture and resist hydrogen molecules. More specifically, embodiments of the invention comprise yeast belonging to the genus *Williopsis*; in particular an isolated yeast *Williopsis* sp. deposited at American Type Culture Collection bearing accession number PTA-121653. The nutrients in which the yeast is cultured preferably comprise sugars.

Embodiments of the present invention further comprise a new generation elastomeric biopolymer made in accordance with the following steps: inoculating growth medium with an isolated yeast belonging to the genus *Williopsis*, providing nutrients to the growth medium, growing the yeast, producing the biopolymer, isolating the polymer, and purifying the polymer.

In one embodiment, the growing step is carried out aerobically. In one embodiment, the growing is carried out between approximately 20° C. and approximately 40° C. In one embodiment, the growing is carried out at a pH between approximately 2 and approximately 9.

In one embodiment, the isolating is carried out by harvesting the medium while preserving the yeast for further production. In another embodiment, the isolating is carried out by centrifugation.

Embodiments of the present invention further comprise an inflatable container made of elastomeric biopolymer for use in hydrogen gas storage. Another embodiment comprises a steel container comprising a coat of elastomeric biopolymer for use in hydrogen gas storage. A different embodiment comprises corrosion and leakage resistant piping systems comprising elastomeric biopolymer for the transportation of hydrogen gas and for natural gas refining processes.

A different embodiment comprises a composition comprising an elastomeric biopolymer combined with one or more adhesives, such as hydrosilicones.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 4A is a photograph of the biopolymer shown in its water soluble form;

FIG. 4B is a photograph of the biopolymer shown after purification;

DETAILED DESCRIPTION OF THE INVENTION

In the following detailed description, numerous specific details are set forth in order to provide a thorough understanding of the embodiments of the invention. However, it will be understood by one of ordinary skill in the art that the embodiments may be practiced without these specific details. For instance, well known operation or techniques may not be shown in detail. Technical and scientific terms used in this description have the same meaning as commonly understood to one or ordinary skill in the art to which this subject matter belongs.

As used throughout the specification and claims, the term "hydrogen gas" means any gas containing free $H_2$ or its isotopes. As used throughout the specification and claims, the term "resist" refers to a material's impermeability to substances. As used throughout the specification and claims, the term "Hydromer™" refers to a biopolymer produced by an isolated yeast belonging to the family Saccharomycetaceae.

Figures 3A, 3B:
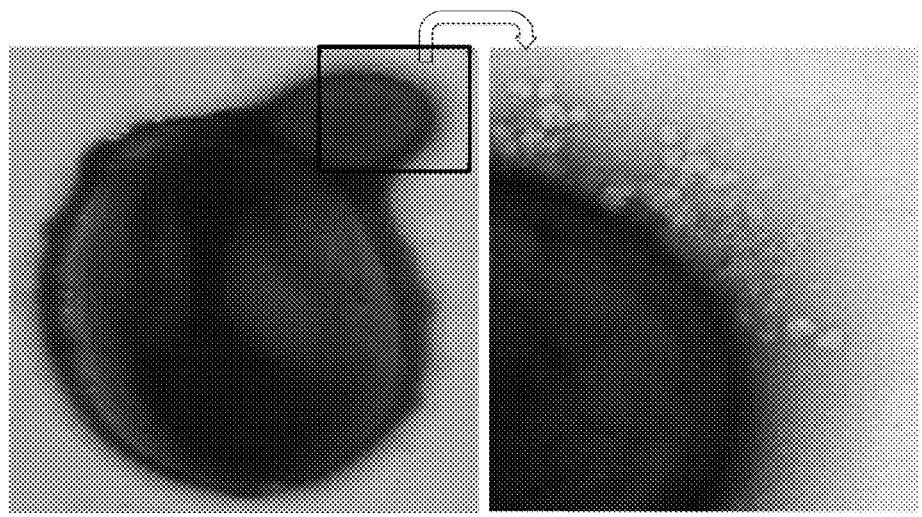
FIG. 3A shows a transmission electron micrograph (TEM) of the *Williopsis* sp. budding.
FIG. 3B is a magnification of the micrograph of FIG. 3A showing the *Williopsis* sp. exporting biopolymer outside of the cell.
Figure 5A:
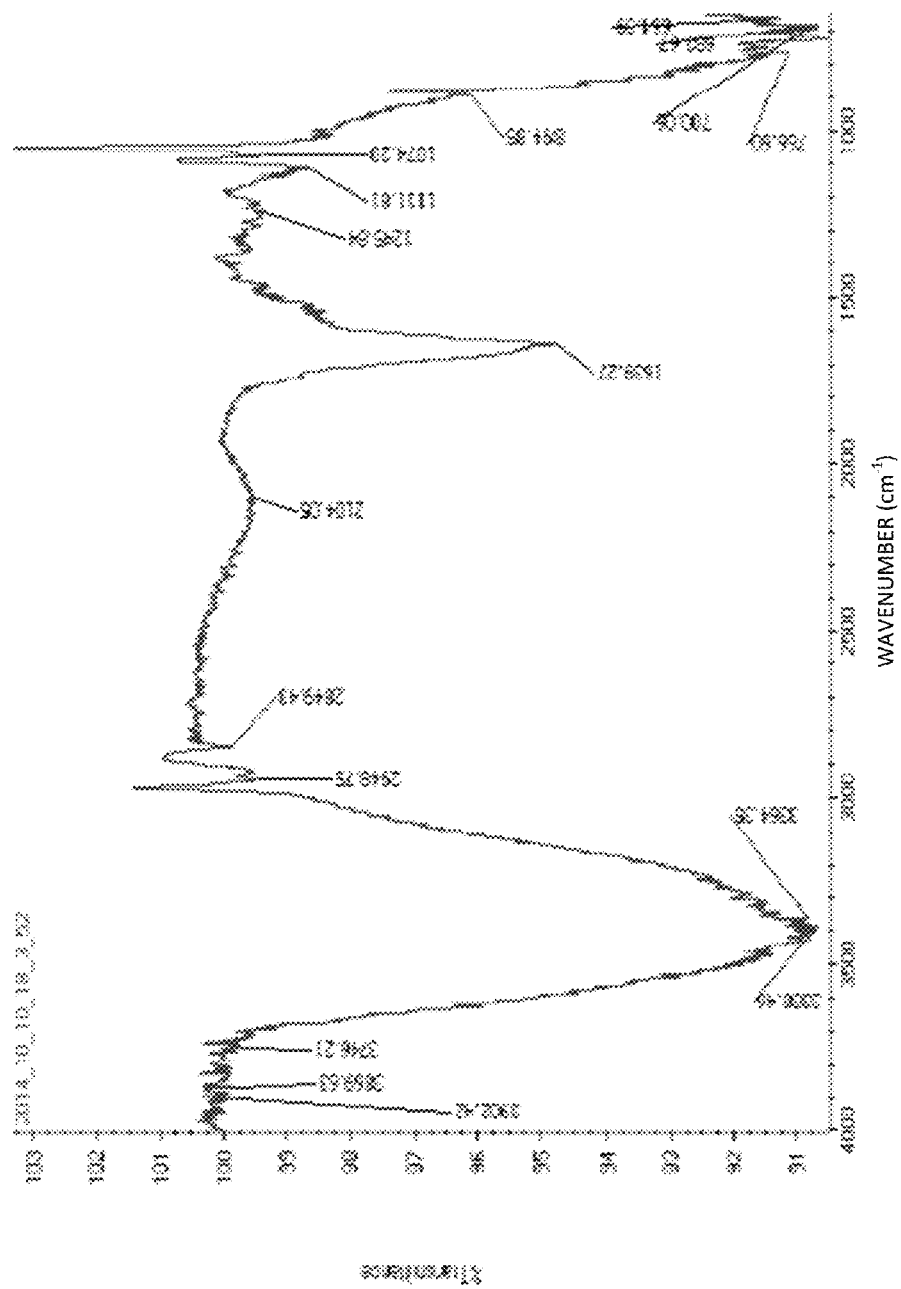
FIG. 5A shows the results of a Fourier-transformed infrared spectroscopy (FTIR) analysis of purified biopolymer.
Figure 5B:
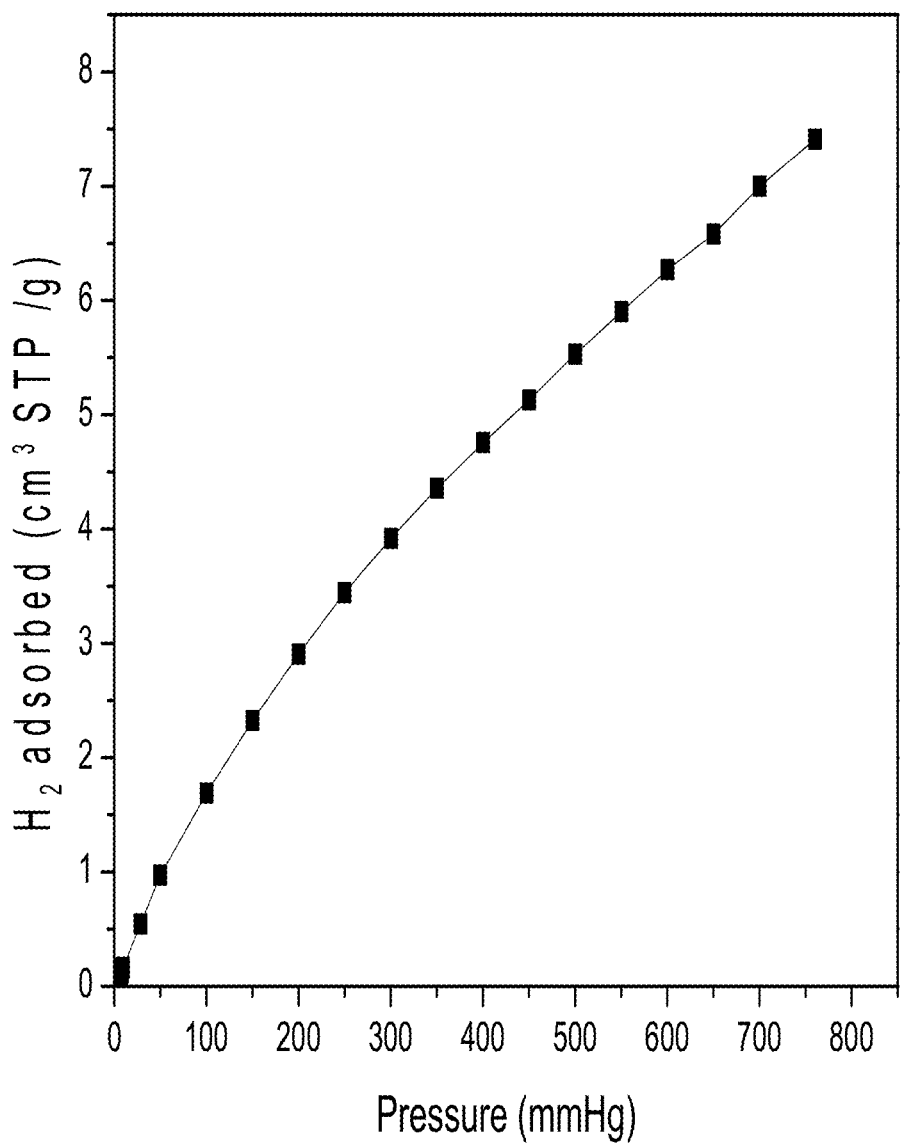
FIG. 5B shows the results of Brunauer-Emmett-Teller (BET) analysis of the biopolymer.

An embodiment of the present invention comprises an elastomeric biopolymer produced by a yeast of the family Saccharomycetaceae isolated after pasteurization and enrichment from a yard waste compost, said elastomeric biopolymer comprising a pore size small enough to capture and resist hydrogen molecules. The biopolymer is produced and secreted by the yeast (see FIG. 3) and is optionally purified by procedures outlined below. Repeated Fourier-transformed infrared spectroscopy (FTIR) analyses indicate that the biopolymer is unique because all matches from multiple libraries were less than a 50% match. The closest matches indicate that the polymer is related to cellophane (FIG. 5A). The biopolymer comprises a Brunauer-Emmett-Teller (BET) surface area of about 50 $m^2/g$, a hydrogen adsorption capacity of about 7 $cm^3/g$ and a pore volume of about 0.02 $cm^3/g$ (FIG. 5B).

The analytical results (FIGS. 4 and 5) and the biological use of the polymer (FIGS. 1 and 3) indicate the Hydromer™ polymer retains hydrogen gas, is impermeable to hydrogen gas, and can be used to protect metal surfaces from the corrosive effects of hydrogen.

Figure 1A:
FIGS. 1A and 1B are images respectively showing enrichment cultures that demonstrate the production of an elastomeric biopolymer on an SDS (Sucrose-Dextrose-Starch) agar plate (FIG. 1A) and in SDS broth (FIG. 1B)
Figure 1B:
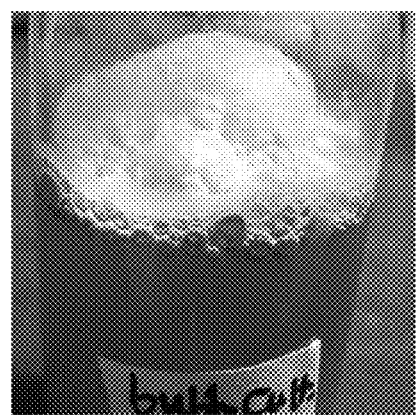

Referring more particularly to FIG. 1, enrichment cultures demonstrate the production of an elastomeric biopolymer on an SDS (Sucrose-Dextrose-Starch) agar plate (1A) and in SDS broth (1B). The contents of the gas bubbles shown in 1A were determined by gas chromatography to range from 50% to 60% hydrogen gas.

In one embodiment, biopolymer is produced by inoculating a single colony isolate of a *Williopsis* sp. into sterile "SDS" growth medium. The isolated yeast *Williopsis* sp. was deposited at American Type Culture Collection, 10801 University Blvd., Manassas, Va., 20110, USA, under accession number PTA-121653 on Oct. 14, 2014.

Preferably, the medium comprises nutrients and reagents such as, but not limited to sucrose, dextrose, starch, proteose peptone, yeast extract, casamino acids, sodium pyruvate, dibasic potassium phosphate, magnesium sulfate, and the like. Preferably, the pH of the culture is between approximately 1 and approximately 10; more preferably between approximately 2 and approximately 8; and most preferably between approximately 3 and approximately 5. Preferably, the yeast is grown aerobically at a suitable temperature (e.g., approximately 30° C.) either on SDS agar plates or in SDS broth. Alternatively, the yeast can grow anaerobically on SDS. Biopolymer is produced to varying degrees under all these conditions, but the time at which polymer is maximally produced varies among these growth regimes.

Optionally, the biopolymer is isolated, concentrated and purified from liquid yeast cultures. The yeast is preferably grown, for example, for about 48 hours at about 30° C. at about 50 rpm, and then separated from the polymer by, for example, centrifugation at about 5000 rpm for about 20 min. The supernatant is preferably concentrated and purified.

In one embodiment, the supernatant is dialyzed against 10× volume purified water at room temperature using 3000 MWCO dialysis tubing. See FIG. 4B. Referring to FIG. 4A, the polymer is therein shown in its water-soluble form. Note that both preparations were purified from 40 mL of two-day old *Williopsis* culture medium and yielded about 5 mg fresh wt./mL culture.

In a different embodiment, equal volumes of 100% ethanol are preferably added to the supernatant, allowed to freeze, e.g., for 1 hour, and preferably spun at about 10,000 rpm for about 30 minutes. The supernatant is preferably discarded, while the pellet is preferably rinsed with 70% ethanol, spun, preferably rinsed again with 70% ethanol and then preferably allowed to air dry.

In another embodiment of the invention, the supernatant is preferably placed in 3000 MWCO dialysis tubing and buried at, for example, room temperature (or 4° C.) in enough polyethylene glycol (PEG, 8000 MW) to cover the supernatant in the dialysis tubing and preferably allowed to concentrate until 1-3 mL is left in the tubing (for 100 mL, this is an overnight incubation). The concentrate is either pelleted at about 5000 rpm for about 10 minutes to then air dry the polymer. Alternatively, distilled water is added to the concentrate.

In one embodiment of the present invention, the hydrogen-trapping biopolymer is produced by the yeast grown in co-culture with biohydrogen producing organisms using an organic feedstock. As the hydrogen gas is produced, the polymer preferably simultaneously traps the produced gas. As the hydrogen accumulates, the elastomeric polymer preferably expands to continue trapping and storing the gas. In a biohydrogen production system, the gas is then separated for purification.

Another embodiment of the present invention comprises storing and transporting hydrogen gas. In one embodiment, storage vessels and/or pipelines are preferably built from polymer produced by yeast of the family Saccharomycetaceae for storage and transport of hydrogen as an alternative to using expensive stainless steel containers or pipelines. Preferably, the biopolymer is combined with existing plastics, for example, polypropylene and the like, for manufacturing robust vessels and/or pipelines. In another embodiment, the biopolymer is preferably used directly as a coating on existing pipe materials as protection against hydrogen corrosion. Alternatively, the polymer is combined with adhesive materials such as silane, a hydrosilicone, in order to coat the surface of conventional containers/pipelines used for hydrogen storage and transport.

INDUSTRIAL APPLICABILITY

The invention is further illustrated by the following non-limiting examples.

Example 1

Figure 2A:
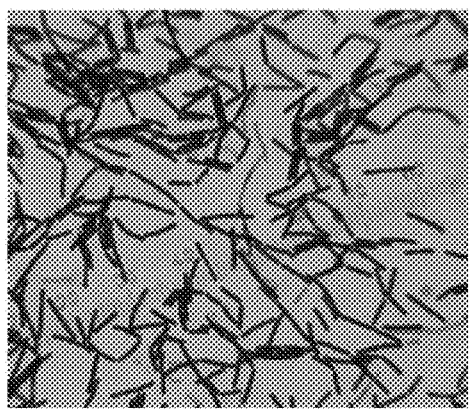
FIGS. 2A and 2B are images showing bacterial and fungal components of a co-culture.
Figure 2B:
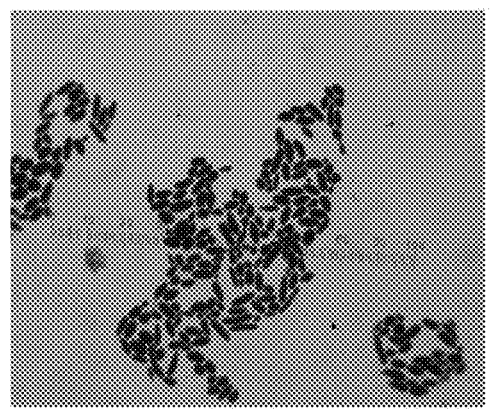

Referring to FIGS. 2A-B, bacterial and fungal components of a co-culture were distinguished by using 0.45 mg/mL Cyclohexamide, which eliminated the yeast (2A) or by using 0.045 mg/mL ampicillin, which eliminated the bacteria (2B). The yeast culture in 2B was sequentially passaged on SDS agar and repeatedly shown to be a pure culture. DNA was isolated from the yeast cells, PCR-amplified with eukaryotic ribosomal DNA primers (forward primer nu-SSU-0817-5 and reverse primer nu-SSU-1196-3). The ampificons were sequenced on a Lumina platform. All amplificon sequences were submitted to Basic Local Alignment Sequence Tool (BLAST) analyses and all sequences were greater than 97% sequence identity to *Williopsis* species. One such 18 S rDNA sequence is shown below.

```
                                         (SEQ. ID. NO. 1)
ATTATCAGATTAGCCATGCATGTCTAAGTATAAGCAATTTATACAGTGAAA

CTGCGAATGGCTCATTAAATCAGTTATAGTTTATTTGATAGTACCTTACTA

CTCGGATACCCGTGGTAATTCTAGAGCTAATACGTGCTAAAAACCCCGACT

GCTTGGGAGGGGTGTATTTATTAGATAAAAAATCAATGCCTTCGGGCTCTT

TGATGATTCATAATAACTTCTCGAATCGCATGGCTTCATGCCGGCGATGGT

TCATTCAAATTTCTGCCCTATCAACTGTCGATGGTAGGATAGTGGCCTACC

ATGGTGGCAACGGGTAACGGGGAATAAGGGTTCGATTCCGGAGAGGGAGCC

TGAGAAACGGCTACCACATCCAAGGAAGGCAGCAGGCGCGCAAATTACCCA

ATCCTAATTCAGGGAGGTAGTGACAATAAATAACGATACAGGGCCCTTATG

GGTCTTGTAATTGGAATGAGTACAATGTAAATACCTTAACGAGGAACAATT

GGAGGGCAAGTCTGGTGCCAGCAGCCGCGGTAATTCCAGCTCCAATAGCGT

ATATTAAAGTTGTTGCAGTTAAAAAGCTCGTAGTTGAACTTTGGGCTTGGT

AGGCCGGTCCGCTTTTTGGCGTGTACTGGTCCCTACCGAGCCTTTCCTTCT

GGCTAACTATCCTTCGGGGTAGCGAACCAGGACTTTTACTTTGAAAAAATT

AGAGTGTTCAAAGCAGGCCTTTGCTCGAATATATTAGCATGGAATAATAGA

ATAGGACGTTTGGTTCTATTTTGTTGGTTTCTAGGACCATCGTAATGATTA

ATAGGGACGGTCGGGGGCATCAGTATTCAGTTGTCAGAGGTGAAATTCTTG

GATTTACTGAAGACTAACTACTGCGAAAGCATTTGCCAAGGACGTTTTCAT

TAATCAAGAACGAAAGTTAGGGGATCGAAGATGATCAGATACCGTCGTAGT

CTTAACCATAAACTATGCCGACTAGGGATCGGGTGTTGTTTTTATAATGAC

TCACTCGGCACCTTACGAGAAATCAAAGTCTTTGGGTTCTGGGGGGAGTAT

GGTCGCAAGGCTGAAACTTAAAGGAATTGACGGAAGGGCACCACCAGGAGT

GGAGCCTGCGGCTTAATTTGACTCAACACGGGGAAACTCACCAGGTCCAGA

CACAATAAGGATTGACAGATTGAGAGCTCTTTCTTGATTTTGTGGGTGGTG

GTGCATGGCCGTTCTTAGTTGGTGGAGTGATTTGTCTGCTTAATTGCGATA

ACGACGAGACCTTAACCTACTAAATAGTGCGACTAGCTTTTGCTGGTATTG

TCACTTCTTAGAGGGACTATCGATTTCAAGTCGATGGAAGTTTGAGGCAAT

AACAGGTCTGTGATGCCCTTAGACGTTCTGGGCCGCACGCGCGCTACACTG

ACGGAGCCAGCGAGTCTAACCTTGGCCGAGAGGTCATGGGTAATCTTGTGA

AACTCCGTCGTGCTGGGGATAGAGCATTGCAATTATTGCTCTTCAACGAGG

AATTCCTAGTAAGCGCAAGTCATCAGCTTGCGTTGATTACGTCCCTGCCCT

TTGTACACACCGCCCGTCGCTACTACCGATTGAATGGCTTAGTGAGGCTTC

AGGATTGGCTTAAAGCAGGAGGCAACTCCAGCTGGAGCCGAGAATCTATCA

AAAACCA
```

Polymer was produced by inoculating a single colony isolate of the *Williopsis* sp. deposited under ATCC Accession No. PTA-121653 into sterile SDS growth medium (amounts are in g/L) under the following conditions: 10 g Sucrose, 0.5 g Dextrose, 0.5 g Starch, soluble, 0.5 g Proteose Peptone, 0.5 g Yeast Extract, 0.5 g Casamino Acids, 0.3 g Sodium Pyruvate, 0.3 g Dibasic Potassium Phosphate, 0.05 g Magnesium Sulfate. pH was adjusted to about 4 with 1M HCl.

Example 2

Biopolymer was isolated, concentrated, and purified by scrapping several 3 mm loops of pure polymer culture from a plate. The loops of polymer were placed in pH11 NaOH, vortexed vigorously then heated in an 80° C. water bath for 30 min. The suspension was centrifuged at 6500 rpm for 10 min, the NaOH decanted from the pellet. The pellet was resuspended in deionized water, vortexed to resuspend material, centrifuged at 6500 rpm for 2 min., and the supernatant was decanted (this rinse was repeated 3 times).

Example 3

Biopolymer was isolated, concentrated and purified from liquid yeast cultures. The yeast was grown for 48 hours at 30° C. at 50 rpm, the yeast was then separated from the polymer by centrifugation at 5000 rpm for 20 min. The supernatant was concentrated and purified by dialyzing against 10× volume purified water at room temperature using 3000 MWCO dialysis tubing. This dialysate was used in the FTIR analysis shown in FIG. 5A.

The supernatant was also concentrated and purified by adding equal volumes of 100% ethanol, allowed to freeze for 1 hour, and spun at 10,000 rpm for 30 minutes. The supernatant was discarded, while the pellet was rinsed with 70% ethanol, spun, rinsed again with 70% ethanol and then allowed to air dry.

The supernatant was also concentrated and purify by putting it in 3000 MWCO dialysis tubing and buried at room temperature (or 4° C.) in enough polyethylene glycol (PEG, 8000 MW) to cover the supernatant in the dialysis tubing and allowed to concentrate until 1-3 mL was left in the tubing (for 100 mL, this is an overnight incubation). The concentrate was either pelleted at 5000 rpm for 10 minute to then air dry the polymer, or distilled water was added.

Referring to FIG. 5A, a FTIR analysis indicated the biopolymer is a unique organic polymer related to, but substantially modified from, cellophane. The biopolymer was also analyzed by Brunauer-Emmett-Teller (BET), which yielded the following characteristics: a surface area of about 50 $m^2/g$, a hydrogen adsorption capacity of about 7 $cm^3/g$ at 760 mm Hg pressure and a pore volume of about 0.02 $cm^3/g$.

The preceding examples can be repeated with similar success by substituting the generically or specifically described reactants and/or parameters of this invention for those used in the preceding examples.

Note that in the specification and claims, "about" or "approximately" means within twenty percent (20%) of the numerical amount cited. Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An elastomeric biopolymer made in accordance with the following steps:
   - inoculating growth medium with an isolated yeast belonging to the genus *Williopsis;*
   - providing nutrients to the growth medium;
   - growing the yeast;
   - producing the biopolymer;
   - isolating the polymer; and
   - purifying the polymer.

2. The elastomeric biopolymer according to claim 1 wherein the growing step is carried out aerobically.

3. The elastomeric biopolymer according to claim 1 wherein the growing is carried out between approximately 20° C. and approximately 40° C.

4. The elastomeric biopolymer according to claim 1 wherein the growing is carried out at a pH between approximately 2 and approximately 9.

5. The elastomeric biopolymer according to claim 1 wherein the isolating is carried out by harvesting the medium while preserving the yeast for further production.

6. The elastomeric biopolymer according to claim 1 wherein the isolating is carried out by centrifugation.

* * * * *

SEQUENCE LISTING

```
<160> NUMBER OF SEQ ID NOS: 1

<210> SEQ ID NO 1
<211> LENGTH: 1690
<212> TYPE: DNA
<213> ORGANISM: Unknown
<220> FEATURE:
<223> OTHER INFORMATION: Yeast

<400> SEQUENCE: 1
attatcagat tagccatgca tgtctaagta taagcaattt atacagtgaa actgcgaatg      60
gctcattaaa tcagttatag tttatttgat agtaccttac tactcggata cccgtggtaa     120
ttctagagct aatacgtgct aaaaaccccg actgcttggg aggggtgtat ttattagata     180
aaaaatcaat gccttcgggc tctttgatga ttcataataa cttctcgaat cgcatggctt     240
catgccggcg atggttcatt caaatttctg ccctatcaac tgtcgatggt aggatagtgg     300
cctaccatgg tggcaacggg taacggggaa taagggttcg attccggaga gggagcctga     360
gaaacggcta ccacatccaa ggaaggcagc aggcgcgcaa attacccaat cctaattcag     420
ggaggtagtg acaataaata acgatacagg gcccttatgt gtcttgtaat tggaatgagt     480
acaatgtaaa taccttaacg aggaacaatt ggagggcaag tctggtgcca gcagccgcgg     540
taattccagc tccaatagcg tatattaaag ttgttgcagt taaaaagctc gtagttgaac     600
tttgggcttg gtaggccggt ccgcttttg gcgtgtactg gtccctaccg agcctttcct     660
tctggctaac tatccttcgg ggtagcgaac caggactttt actttgaaaa aattagagtg     720
ttcaaagcag gcctttgctc gaatatatta gcatggaata atagaatagg acgtttggtt     780
ctattttgtt ggtttctagg accatcgtaa tgattaatag ggacggtcgg gggcatcagt     840
attcagttgt cagaggtgaa attcttggat ttactgaaga ctaactactg cgaaagcatt     900
tgccaaggac gttttcatta atcaagaacg aaagttaggg gatcgaagat gatcagatac     960
cgtcgtagtc ttaaccataa actatgccga ctagggatcg ggtgttgttt ttataatgac    1020
tcactcggca ccttacgaga aatcaaagtc tttgggttct gggggagta tggtcgcaag    1080 gctgaaactt aaaggaattg acggaagggc accaccagga gtgagcctg cggcttaatt    1140 tgactcaaca cggggaaact caccaggtcc agacacaata aggattgaca gattgagagc    1200
```

```
tctttcttga ttttgtgggt ggtggtgcat ggccgttctt agttggtgga gtgatttgtc    1260
tgcttaattg cgataacgac gagaccttaa cctactaaat agtgcgacta gcttttgctg    1320
gtattgtcac ttcttagagg gactatcgat ttcaagtcga tggaagtttg aggcaataac    1380
aggtctgtga tgcccttaga cgttctgggc cgcacgcgcg ctacactgac ggagccagcg    1440
agtctaacct tggccgagag gtcatgggta atcttgtgaa actccgtcgt gctggggata    1500
gagcattgca attattgctc ttcaacgagg aattcctagt aagcgcaagt catcagcttg    1560
cgttgattac gtccctgccc tttgtacaca ccgcccgtcg ctactaccga ttgaatggct    1620
tagtgaggct tcaggattgg cttaaagcag gaggcaactc cagctggagc cgagaatcta    1680
tcaaaaacca                                                           1690
```